(12) United States Patent
Audsley et al.

(10) Patent No.: US 9,483,538 B1
(45) Date of Patent: Nov. 1, 2016

(54) TWO-WAY DATA SHARING BETWEEN DISPARATE DATA STORES

(75) Inventors: Barry L. Audsley, Olathe, KS (US); Kelby E. Dickey, Lenexa, KS (US); Stefan Stroebel, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 841 days.

(21) Appl. No.: 13/434,468

(22) Filed: Mar. 29, 2012

(51) Int. Cl.
*G06F 17/30* (2006.01)
(52) U.S. Cl.
CPC .............................. *G06F 17/30575* (2013.01)
(58) Field of Classification Search
CPC .................................................. G06F 17/30575
See application file for complete search history.

(56) References Cited

U.S. PATENT DOCUMENTS

| | | | | |
|---|---|---|---|---|
| 5,588,147 A | * | 12/1996 | Neeman et al. | 707/999.001 |
| 2005/0097396 A1 | * | 5/2005 | Wood | 714/25 |
| 2006/0059253 A1 | * | 3/2006 | Goodman et al. | 709/223 |
| 2006/0092861 A1 | * | 5/2006 | Corday et al. | 370/256 |
| 2010/0312597 A1 | * | 12/2010 | Ellisor, Jr. | 705/7 |

* cited by examiner

*Primary Examiner* — Matthew Gart
*Assistant Examiner* — Nadja Chong Cruz

(57) ABSTRACT

A system for data sharing. The system comprises a ticket management application comprising a link to an asset bridging data structure, where the asset bridging data structure is stored in an asset data store, a ticket data store coupled to the ticket management application and comprising data structures associated with tickets and data structures associated with a current view of asset information stored in the asset data store, an asset management application for managing information about assets, where the asset management application is separate from the ticket management application, the asset data store comprising the asset bridging data structure, a mirrored asset bridging data structure, and data structures comprising asset information, a script that copies changes in the asset bridging data structure to the mirrored asset bridging data structure, and a script that writes attributes in the mirrored bridging data structure into the plurality of data structures comprising asset information.

10 Claims, 2 Drawing Sheets

TWO-WAY DATA SHARING BETWEEN DISPARATE DATA STORES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises use a variety of information technology applications to achieve business objectives such as increased productivity, reduced cycle time, increased visibility into process flows, improved tracking of inventory, and other objectives. Different applications or software programs may be developed to address these business objectives separately. Ticket management systems may promote documenting and tracking business activities and manage the flow among different states in business processes.

For example, a ticket may be entered to document an identified software problem. The ticket may be assigned to a sequence of persons responsible for satisfying the need. A first person may be an analyst who determines a plan for satisfying the need and updates the ticket with the result of the analysis. A second person may be a budget planner who analyzes the cost of taking the identified corrective action and updates the ticket with the result of the budget planning. A third person may be a department manager who schedules and allocates resources based on a budget to perform the task identified in the ticket and updates the ticket with the result of management planning. A fourth person may be an expeditor who orders capital equipment to satisfy the need and updates the ticket with the receipts of the purchase order. A fifth person may be a shipping dock receiver who receives the ordered capital equipment and updates the ticket to indicate the receipt of the equipment. A sixth person may be an information technologist who installs and brings on line a new server computer and updates the ticket accordingly. This is a simple example of how a ticket may flow through different states in an enterprise work flow.

An asset management system may be used to track the location and state of assets. For example, hours in operation, location, maintenance history, and other information about the subject asset may be recorded and tracked using the asset management system.

SUMMARY

In an embodiment, a system for data sharing is disclosed. The system comprises a ticket management application for managing tickets related to an enterprise business workflow, where the ticket management application comprises a link to an asset bridging data structure, where the asset bridging data structure is stored in an asset data store, and where the ticket management application executes on a computer system. The system further comprises a ticket data store coupled to the ticket management application and comprising data structures associated with information associated with the tickets, wherein the ticket data store further comprises data structures associated with a current view of asset information stored in the asset data store. The system further comprises an asset management application for managing information about assets, where the asset information comprises a plurality of attributes associated with each asset, where the asset management application executes on a computer system, and where the asset management application is separate and distinct from the ticket management application. The system further comprises the asset data store comprising the asset bridging data structure, a mirrored asset bridging data structure, and a plurality of data structures comprising asset information. The system further comprises a mirroring script that periodically identifies changes in the asset bridging data structure and copies those changes to the mirrored asset bridging data structure. The system further comprises at least one parsing script that parses entries in the mirrored asset bridging data structure into a plurality of attributes of an asset and writes these attributes into the plurality of data structures comprising asset information. The ticket management application shares data to the asset management application by writing into the asset bridging data structure.

In an embodiment, a system for data sharing is disclosed. The system comprises an asset management application for managing information about assets of an enterprise, wherein the information comprises a plurality of attributes associated with each asset and the asset management application executes on a computer system. The system further comprises a ticket management application for managing information about tickets, where each ticket is related to an enterprise business workflow, wherein the ticket management application executes on a computer system, and wherein the ticket management application is a separate and distinct system from the asset management application, wherein the ticket management application has a current view of asset management information related to tickets, and wherein at least some actions performed on ticket information is propagated to the asset management system by the ticket management application in near real-time.

In an embodiment, a system for data sharing is disclosed. The system comprises a ticket management application for managing tickets related to an enterprise business workflow, comprising a link to an asset bridging data structure, where the asset bridging data structure is stored in an asset data store and a ticket data store coupled to the ticket management application and comprising data structures associated with information associated with the tickets. The system further comprises an asset management application for managing information about assets, where the asset management application is separate and distinct from the ticket management application and the asset data store comprising the asset bridging data structure, a mirrored asset bridging data structure, and a plurality of data structures comprising asset information. The system further comprises a mirroring script that periodically identifies changes in the asset bridging data structure and copies those changes to the mirrored asset bridging data structure at least one parsing script that parses entries in the mirrored asset bridging data structure into a plurality of attributes of an asset and writes these attributes into the plurality of data structures comprising asset information. The ticket management application shares data to the asset management application by writing into the asset bridging data structure In an embodiment, a method of data sharing is disclosed. The method comprises managing tickets related to an enterprise business workflow by a ticket management application executing on a computer system and coupled to a ticket data store comprising data structures associated with information associated with the tickets, where the ticket management application maintains a link to an asset bridging data structure, and where the asset bridging data structure is stored in an asset data store. The method further comprises managing information about assets by an asset management application executing on a computer system and coupled to the asset data store, where the asset data store comprises the asset bridging data structure, a mirrored asset bridging data structure, and a plurality of data structures comprising asset information, and where the asset management application is separate and distinct from the ticket management application. The method further comprises periodically identifying changes in the asset bridging data structure and copying those changes to the mirrored asset bridging data structure by a mirroring script. The method further comprises parsing entries in the mirrored asset bridging data structure into a plurality of attributes of an asset and writing these attributes into the plurality of data structures comprising asset information by a parsing script, wherein the ticket management application shares data to the asset management application by writing into the asset bridging data structure.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
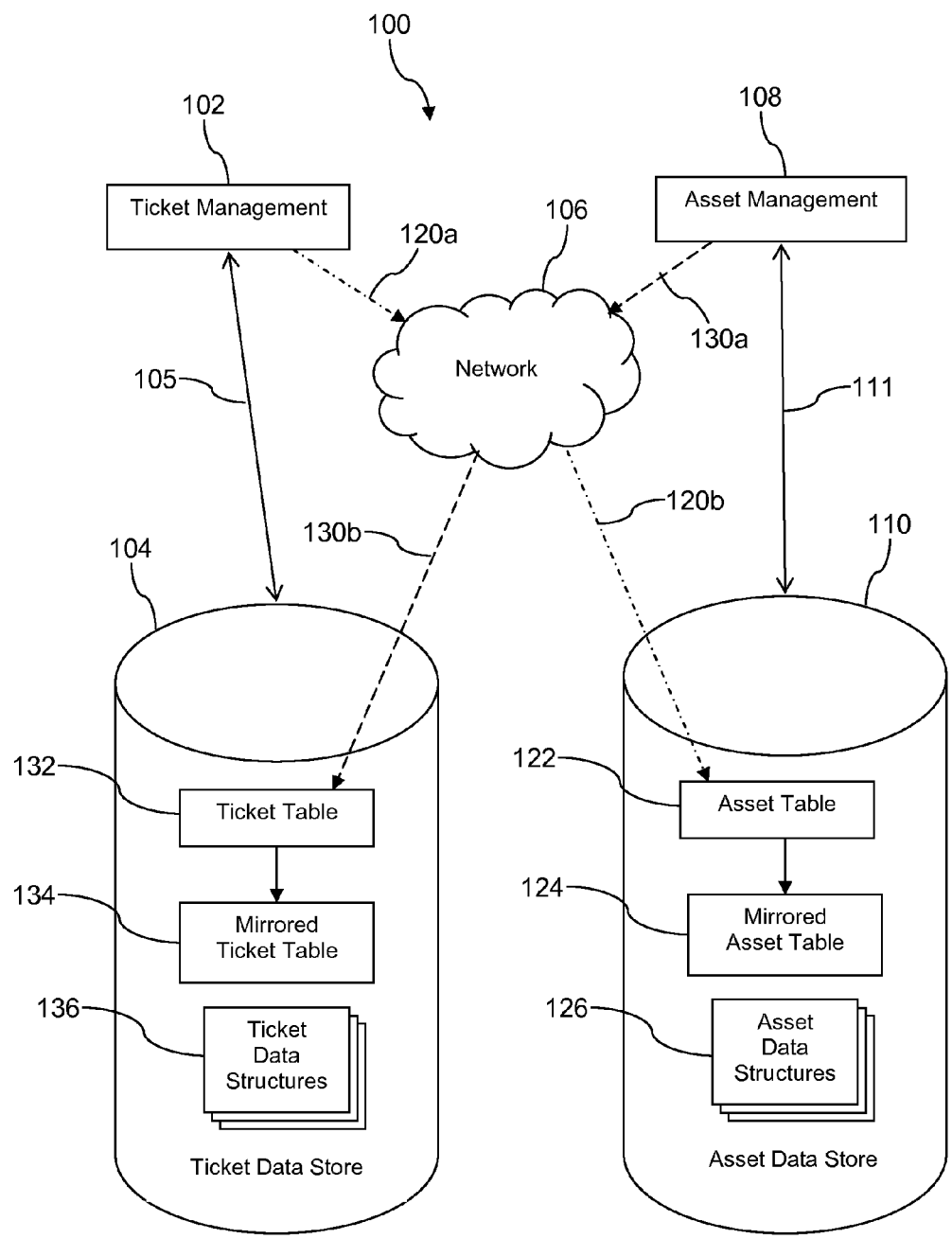
FIG. 1 is an illustration of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for propagating information between disparate data stores associated with different enterprise applications is disclosed. A system for propagating information from a ticket management application to an asset management application and for propagating information from the asset management application to the ticket management application is discussed in detail herein, but it is understood that the system and methods taught are contemplated as suitable as well to other disparate and separate enterprise applications. A ticket data store associated with the ticket management application is separate and distinct from an asset data store associated with the asset management application in that these different data stores may execute on different computer systems and may comprise mostly data structures that are defined by different schemas or other specification of data structures. In typical prior art systems, sharing data between such separate and distinct data stores automatically and in near real-time may not have been supported.

The ticket management application is associated with a ticket data store, and the asset management application is associated with an asset data store. In an embodiment, the ticket data store may be implemented by a first database system and the asset data store may be implemented by a second database system. In other embodiments, however, other data store structures and/or abstractions may be used. The asset data store may comprise an asset table that is write-accessible to the ticket management application. To make the asset table write-accessible to the ticket management application, the ticket management application may be provisioned with a link that references the asset table in the asset data store. Typically the ticket management system would write to data structures or tables located in the ticket data store. The asset data store further comprises a mirrored asset table. An application executes periodically to determine if any updates to the asset table have occurred, and when an update has occurred, the application copies the updated information into the mirrored asset table. Thus, the mirrored asset table is maintained substantially equivalent to the asset table.

Unlike the asset table that is controlled by the ticket management application, the mirrored asset table is owned or controlled by the asset management application. When an update or entry is written into the mirrored asset table, one or more trigger scripts or functions may execute that parses the entry in the mirrored asset table and stores this information into asset data structures, such as a relational database tables for example. In this way, information that may otherwise be siloed within the ticket management system may be propagated across boundaries of separate data stores.

In a like manner, the ticket data store may comprise a ticket table that is write-accessible to the asset management application. To make the ticket table write-accessible to the asset management application, the asset management application may be provisioned with a link that references the ticket table in the ticket data store. The ticket data store further comprises a mirrored ticket table. Another application executes periodically to determine if any updates to the ticket table have occurred, and when an update has occurred, the other application copies the update information into the mirrored ticket table. Thus the mirrored ticket table is maintained substantially equivalent to the ticket table. Unlike the ticket table that is owned and controlled by the asset management application, the mirrored ticket table is owned or controlled by the ticket management application. When an update or entry is written into the mirrored ticket table, one or more trigger scripts or functions may execute that parses the entry in the mirrored ticket table and stores this information into ticket data structures, such as relational database tables for example. In this way, information that may otherwise remain siloed within the asset management system may be propagated across boundaries of separate data stores.

By creating a ticket table in the asset data store that is owned by the ticket management application and providing the mirrored ticket table owned by the asset management application, the present system promotes easy and near real-time propagation of ticket information into the data store visible to and under control of the asset management system while maintaining the primary asset management tables—that is the asset tables provided specifically to support asset manager application functionality—relatively unchanged. The same advantage can be seen in the corresponding structure for flowing asset information into an asset management application table in the ticket data store and providing the mirrored asset table owned by the ticket management application. It may be said that the present system provides for cross-application information flow that is transparent to each application.

Turning now to FIG. 1, a system 100 for two-way data sharing between disparate data stores is described. In an embodiment, the system 100 comprises a ticket management application 102, a ticket data store 104, a network 106, an asset management application 108, and an asset data store 110. It is understood that the system and methods described herein may be employed to promote two-way data sharing between other disparate data stores, for example data stores other than the ticket data store 104 and/or the asset data store 110. The network 106 may comprise any combination of public networks and/or private networks. The ticket management application 102 may execute on a first computer system, and the asset management application 108 may execute on a second computer system. In an embodiment, the applications 102, 108 may execute on the same computer system. Computer systems are described further hereinafter.

While not shown, it is understood that users may be provided with a user interface, for example a graphical user interface in a web browser session, which may be used to interact with and access the functionality of the ticket management application 102. Likewise, while not shown, it is understood that users may be provided with a user interface, for example a graphical user interface in a web browser session, which may be used by users to interact with and access the functionality of the asset management application 108. Because the user interfaces are typically separate interfaces, if users need to work in both applications 102, 108 to accomplish their work tasks, formerly they may have been obliged to perform what may be referred to as "swivel seating." Swivel seating is associated with working first in one application, rotating in one's chair to work in a second application, possibly entering duplicate information into the second application. The system 100 promotes automatic propagation of information from one to the other of the applications 102, 108, thereby avoiding the inefficient and error prone practice of swivel seating.

The ticket data store 104 may comprise a ticket table 132, a mirrored ticket table 134, and a plurality of ticket data structures 136. Normal accesses of the ticket management application 102 to the ticket data structures 136 in the ticket data store 104 are illustrated by a bi-directional arrow 105. While the arrow 105 is illustrated as directly linked between the ticket management application 102 and the ticket data store 104, it is understood that the communication link represented by the arrow 105 may pass through the network 106. The asset data store 110 may comprise an asset table 122, a mirrored asset table 124, and a plurality of asset data structures 126. Normal accesses of the asset management application 108 to the associated asset data store 110 is illustrated by a bi-directional arrow 111. While the arrow 111 is illustrated as directly linked between the asset management application 108 and the asset data store 110, it is understood that the communication link represented by the arrow 111 may pass through the network 106.

It may happen sometimes that information written by the ticket management application 102 into the ticket data structures 136 may bear on or be related in some way to information in the asset data structures 126. The ticket management application 102 may write this associated information into the asset table 122 in the asset data store 110 via communication link 120a and communication link 120b. The information may comprise a plurality of attributes, for example asset attributes. The asset data store 110 may be provided with an asset mirroring application or script that periodically examines the asset table 122 to identify any new entries or modification of existing entries since the previous execution. When the asset mirroring application or script identifies a change, the asset mirroring application or script writes the change information to the mirrored asset table 124. In some contexts, the asset table 122 may be referred to as an asset bridging data structure, and the mirrored asset table 124 may be referred to as a mirrored asset bridging data structure.

The asset data store 110 may further be provided or configured with one or more trigger scripts or trigger functions that activate in response to changes in the mirrored asset table 124, parse the data in the change, and write data associated with the change into entries in the asset data structures 126. For example, a script parses the change to select attributes and/or attribute values and to write these attribute values into appropriate attributes in the asset data structures 126. The attributes may comprise a location attribute, a timestamp attribute, a responsible individual attribute such as a person receiving the asset at a delivery point, and/or other attributes. In this manner, entry of information in the ticket management application 102 may be propagated to the asset data structures 126 in the asset data store 110 without swivel seating. The automated update of information entered into the ticket management application 102 in the asset data store 110 may be said to provide a current view of ticket information in the asset data store 110. The assets may be associated with information technology equipment such as computers, servers, printers, routers, output devices, and other equipment. Some or all of the information that is propagated to the asset data store 110 may also be written by the ticket management application 102 into the ticket data store 104.

In an embodiment, the asset mirroring application or script may execute about once per minute; about once every five minutes; or some other periodic interval. The rate at which information is thereby propagated to the asset data structures 126 and made available to the use of the asset management application 108 may be referred to as near real-time updating.

Sometimes information that is written into the asset data store 110 by the asset management application 108 may have bearing on or relate to the ticket data structures 136. The asset management application 108 may write this information into the ticket table 132 in the ticket data store 104 via communication link 130a and communication link 130b. The information may comprise a plurality of attributes, for example ticket attributes or fields. The ticket data store 104 may be provided with a ticket mirroring application or script that periodically examines the ticket table 132 to identify any new entries or modification of existing entries since the previous execution. When the ticket mirroring application or script identifies a change, the ticket mirroring application or script writes the change information into the mirrored ticket table 134. In some contexts, the ticket table 132 may be referred to as a ticket bridging data structure, and the mirrored ticket table 134 may be referred to a mirrored ticket bridging data structure.

The ticket data store 104 may further be provided or configured with one or more trigger scripts or trigger functions that activate in response to changes in the mirrored ticket table 134, parse the data in the change, and write the data associated with the change into the entries in the ticket data structures 136. In this manner entry of information in the asset management application 108 may be propagated to the ticket data store 104 without swivel seating. The automated update of information entered into the asset management application 108 in the ticket data store 104 may be said to provide a current view of asset information in the ticket data store 104. Some or all of the information that is propagated to the ticket data store 104 from the asset management application 108 may be also written by the asset management application 108 to the asset data store 110. In an embodiment, the ticket mirroring application or script may execute about once per minute; about once every five minutes; or some other periodic interval. The rate at which information is thereby propagated to the ticket data structures 136 and made available to the ticket management application 102 may be referred to as near real-time updating.

Figure 2:
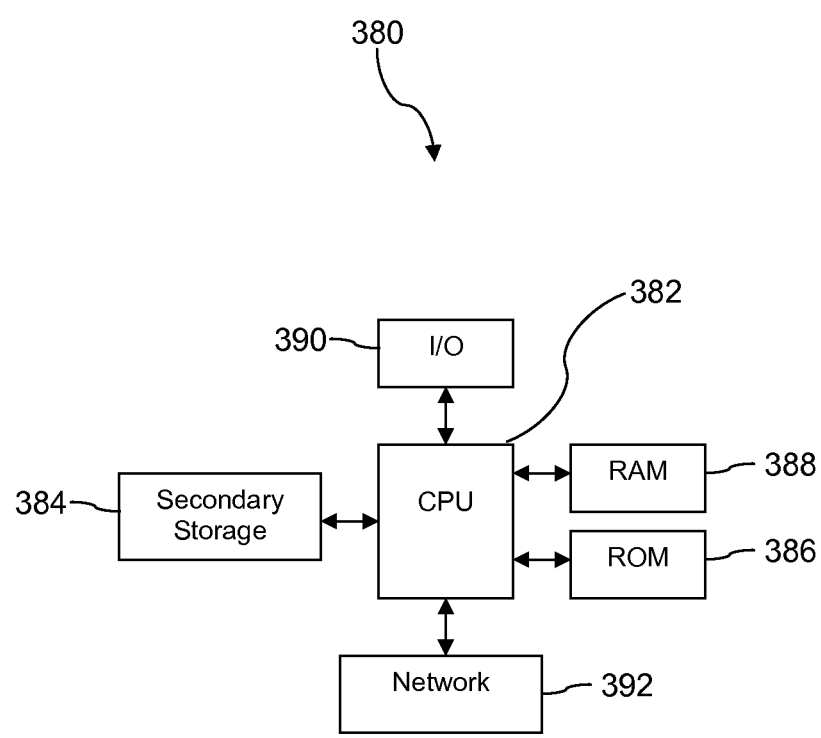
FIG. 2 is an illustration of a computer system according to an embodiment of the disclosure.

FIG. 2 illustrates a computer system 380 suitable for implementing one or more embodiments disclosed herein. For example, the ticket management application 102 may execute on a computer system that is consistent with the computer system 380. Likewise, the asset management application 108 may execute on a computer system that is consistent with the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for data sharing, comprising:
a computer system comprising a ticket management application for managing ticket information associated with tickets related to an enterprise business workflow, wherein the ticket management application comprises a link to an asset bridging data structure, and wherein the asset bridging data structure is stored in an asset data store;
a ticket data store coupled to the ticket management application and comprising a ticket bridging data structure, a mirrored ticket bridging data structure, and a plurality of ticket data structures;
a ticket bridging data structure mirroring script that identifies changes in the ticket bridging data structure and copies those changes to the mirrored ticket bridging data structure;
at least one mirrored ticket bridging data structure parsing script that parses entries in the mirrored ticket bridging data structure into a plurality of attributes of a ticket and writes these attributes into the plurality of ticket data structures;
a computer system comprising an asset management application for managing asset information, wherein the asset information comprises a plurality of attributes associated with each asset, wherein the asset management application comprises a link to the ticket bridging data structure, and wherein the asset management application is separate and distinct from the ticket management application;
the asset data store comprising the asset bridging data structure, a mirrored asset bridging data structure, and a plurality of asset data structures;
an asset bridging data structure mirroring script that identifies changes in the asset bridging data structure and copies those changes to the mirrored asset bridging data structure; and at least one mirrored asset bridging data structure parsing script that parses entries in the mirrored asset bridging data structure into a plurality of attributes of an asset and writes these attributes into the plurality of asset data structures, wherein the ticket management application controls the asset bridging data structure in the asset data store and the mirrored ticket bridging data structure in the ticket data store and shares the ticket information from the ticket data store that is at least partially associated with the asset information to the asset management application by writing into the asset bridging data structure of the asset data store based on the link to the asset bridging data structure, and wherein the asset management application controls the ticket bridging data structure in the ticket data store and the mirrored asset bridging data structure in the asset data store and shares the asset information from the asset data store that is at least partially associated with the ticket information to the ticket management application by writing into the ticket bridging data structure of the ticket data store based on the link to the ticket bridging data structure.

2. The system of claim 1, wherein the ticket bridging data structure mirroring script and the asset bridging data structure mirroring script execute at least once every five minutes.

3. The system of claim 2, wherein the ticket bridging data structure mirroring script and the asset bridging data structure mirroring script execute every minute.

4. The system of claim 1, wherein the ticket management application provides a view of assets based on the mirrored ticket bridging data structure.

5. A method of data sharing, comprising:

managing, by a computer system executing a ticket management application, tickets comprising ticket information, wherein the tickets are related to an enterprise business workflow, wherein the ticket management application is coupled to a ticket data store comprising a ticket bridging data structure, a mirrored ticket bridging data structure, and a plurality of ticket data structures, wherein the ticket management application maintains a link to an asset bridging data structure, and wherein the asset bridging data structure is stored in an asset data store;

identifying, by a computer system executing a ticket bridging data structure mirroring script, changes in the ticket bridging data structure and copying those changes to the mirrored ticket bridging data structure;

parsing, by a computer system executing a ticket bridging data structure parsing script, entries in the mirrored ticket bridging data structure into a plurality of attributes of a ticket and writing these attributes into the plurality of ticket data structures;

managing, by a computer system executing an asset management application, asset information, wherein the asset management application is coupled to the asset data store, wherein the asset management application maintains a link to the ticket bridging data structure, wherein the asset data store comprises the asset bridging data structure, a mirrored asset bridging data structure, and a plurality of asset data structures, and wherein the asset management application is separate and distinct from the ticket management application;

identifying, by a computer system executing an asset bridging data structure mirroring script, changes in the asset bridging data structure and copying those changes to the mirrored asset bridging data structure; and parsing, by a computer system executing an asset bridging data structure parsing script, entries in the mirrored asset bridging data structure into a plurality of attributes of an asset and writing these attributes into the plurality of asset data structures, wherein the ticket management application controls the asset bridging data structure in the asset data store and the mirrored ticket bridging data structure in the ticket data store and shares the ticket information from the ticket data store that is at least partially associated with the asset information to the asset management application by writing into the asset bridging data structure of the asset data store based on the link to the asset bridging data structure, and wherein the asset management application controls the ticket bridging data structure in the ticket data store and the mirrored asset bridging data structure in the asset data store and shares the asset information from the asset data store that is at least partially associated with the ticket information to the ticket management application by writing into the ticket bridging data structure of the ticket data store based on the link to the ticket bridging data structure.

6. The method of claim 5, further comprising tracking location of assets and who is responsible for the assets by the asset management application.

7. The method of claim 5, wherein the assets are associated with information technology equipment.

8. The method of claim 5, wherein the assets are associated with output devices.

9. The method of claim 5, wherein the plurality of ticket data structures and the plurality of asset data structures are database tables.

10. The method of claim 5, wherein the ticket management application provides periodic data updates to the asset management application.

\* \* \* \* \*